(12) United States Patent
Kim

(10) Patent No.: US 7,713,165 B2
(45) Date of Patent: May 11, 2010

(54) HYDRAULIC CONTROL SYSTEM FOR CONTINUOUSLY VARIABLE TRANSMISSION FOR HYBRID ELECTRIC VEHICLE

(75) Inventor: Hyun Suk Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 629 days.

(21) Appl. No.: 11/633,603

(22) Filed: Dec. 4, 2006

(65) Prior Publication Data

US 2008/0045378 A1 Feb. 21, 2008

(30) Foreign Application Priority Data

Aug. 18, 2006 (KR) ...................... 10-2006-0078040

(51) Int. Cl.
*F16H 61/00* (2006.01)
*B60W 10/04* (2006.01)

(52) U.S. Cl. .......................... 477/45; 477/115; 477/906

(58) Field of Classification Search ................... 474/70; 477/43, 44, 45, 46, 50, 115, 125, 127, 906
See application file for complete search history.

(56) References Cited

U.S. PATENT DOCUMENTS

| | | | | |
|---|---|---|---|---|
| 4,644,827 A | * | 2/1987 | Takano et al. ................. | 477/49 |
| 4,764,156 A | * | 8/1988 | Ohkumo ....................... | 474/28 |
| 4,995,283 A | * | 2/1991 | Sawasaki et al. .............. | 477/48 |
| 5,263,387 A | * | 11/1993 | Reniers ....................... | 474/28 |
| 6,783,479 B2 | * | 8/2004 | Agner .......................... | 477/39 |

FOREIGN PATENT DOCUMENTS

| | | | |
|---|---|---|---|
| JP | 07-035209 | | 2/1995 |
| JP | 10-141456 | | 5/1998 |
| JP | 2005-321024 | | 11/2005 |
| JP | 2006207678 A | * | 8/2006 |
| KR | 2003-0083110 | | 10/2003 |
| KR | 2006-0019990 | | 3/2006 |

* cited by examiner

*Primary Examiner*—Roger Pang
(74) *Attorney, Agent, or Firm*—Morgan, Lewis & Bockius LLP

(57) ABSTRACT

A hydraulic control system for a continuously variable transmission for a hybrid electric vehicle enhances operability as speed changes are made based on input torques and engine rotational speeds since pressure of a primary pulley is controlled based on engine rotational speeds; applies a wide pressure range for solenoids in normal operation by deciding a limp home mode only when a secondary control solenoid valve (SCSV) and a ratio control solenoid valve (RCSV) are under maximum pressure at the same time; reuses flux discharged under reduced pressure from a secondary regulator valve in a lubrication control valve, thus saving energy; controls the lubrication pressure actively using PWM; and generates a pilot pressure for clutch control using a single valve when the transmission control unit fails.

7 Claims, 9 Drawing Sheets

HYDRAULIC CONTROL SYSTEM FOR CONTINUOUSLY VARIABLE TRANSMISSION FOR HYBRID ELECTRIC VEHICLE

CROSS-REFERENCE TO RELATED APPLICATION

This application claims the benefit of Korean Patent Application No. 10-2006-0078040, filed on Aug. 18, 2006, the entire disclosure of which is hereby incorporated by reference.

BACKGOUND OF THE INVENTION

The present invention relates to a hydraulic control system for a continuously variable transmission for a hybrid electric vehicle and, more particularly, to a hydraulic control system for a continuously variable transmission (CVT) for a hybrid electric including enhanced limp home control in the event of transmission control unit failure.

In general, it is necessary to control a start clutch in order to secure minimum operability when a transmission control unit (TCU) fails completely in a hybrid electric vehicle using a continuously variable transmission (CVT). However, conventional hydraulic control systems for continuously variable transmissions applies separate structures separating and limiting important functions.

First, since the pressure of the conventional drive pulley is regular, the transmission ratio change is made based on only the input torque. Second, the limp home mode is decided when the conventional CVT drive pulley pressure control valve is being under the maximum pressure. Third, the flux discharged under the reduced pressure from the clutch pressure reducing valve is supplied to a tank. Also, the lubrication pressure is controlled at a fixed pressure by the conventional start clutch shift valve and the lubrication valve, two valves are used as pilot pressure for clutch control when the transmission control unit fails, and flux discharged from the PH regulator valve is used directly as pilot pressure. As a result of these drawbacks in conventional CVTs, improvements are constantly being sought.

SUMMARY OF THE INVENTION

Embodiments of the present invention provide a hydraulic control system for a continuously variable transmission for a hybrid electric vehicle in which speed changes are made based on input torques and engine rotational speeds since a pressure of a primary pulley is controlled by a ratio control valve based on engine rotational speeds when a transmission control unit fails, the ratio control valve being controlled by a ratio control pressure 1 and a ratio control pressure 2.

As an exemplary embodiment, the ratio control valve is controlled by being connected with a start clutch control pressure 1 according as the start clutch control pressure 1 is supplied to a flow path of the ratio control pressure 2 through a limp home valve when the transmission control unit fails and, if the engine rotational speed is increased, the pressure of the ratio control valve rises and the continuously variable transmission moves upward, whereas, if the engine rotational speed is decreased, the pressure of the ratio control valve falls and the continuously variable transmission moves downward.

As another exemplary embodiment, the limp home valve comprises a valve housing, in which a flow path receiving a pressure of a secondary control solenoid valve from an end, a flow path supplying the ratio control pressure 1, and a flow path supplying a pressure to a manual valve are provided in turn at an upper side thereof, a flow path supplying the ratio control pressure 2, a flow path receiving the start clutch control pressure 1, a flow path receiving the pressure of the start clutch control solenoid valve, a flow path receiving a pressure of a start clutch control valve, a flow path receiving a pressure of a secondary regulatory valve and supplying the same to the start clutch control valve, and a flow path receiving the pressure from the secondary regulator valve are provided in turn at a lower side thereof, and a plurality of operation plungers established in series inside the valve housing and a spring supporting the operation plunger positioned at the most right.

Moreover, the hydraulic control system for a continuously variable transmission for a hybrid electric vehicle includes a secondary regulator valve receiving a line pressure to reduce the pressure and supplying the reduced pressure to a lubrication control valve.

Furthermore, the lubrication control valve controls the lubrication pressure actively using PWM and generates a pilot pressure for clutch control using a single valve when the transmission control unit fails.

In addition, the lubrication control valve receives a flux discharged from a line regulator valve and controls the lubrication pressure by a clutch lubrication control solenoid valve and, if the pressure of the line regulator valve is lower than a fixed pressure of the lubrication control valve according as the flux discharged from the line regulator valve is decreased in the region where the engine rotational speed is lowered, the lubrication control valve moves to the right, thus making the pressure of the line regulator valve and the lubrication pressure become equal to each other, whereas, if the pressure of the line regulator valve is higher than the fixed pressure of the lubrication control valve according as the flux discharged from the line regulator valve is increased in the region where the engine rotational speed is increased, the lubrication control valve moves to the left, thus making the fixed pressure of the lubrication control valve become the lubrication pressure.

Moreover, the lubrication control valve comprises: a valve housing, in which a start clutch control pressure 1 flow path supplying a pressure to the start clutch control valve, a start clutch control pressure 2 flow path and a flow path for clutch lubrication pressure control are established in turn at the top thereof, a flow path receiving a flux from the line regulator valve, a discharge port and a flow path receiving a pressure from a clutch lubrication control solenoid valve are arranged at a lower side thereof; and a plurality of operation plungers arranged in series inside the valve housing and a spring supporting the operation plungers elastically.

Furthermore, the start clutch control valve pressure 2 formed through the start clutch control pressure 2 flow path becomes equal to the start clutch control pressure 1 below a fixed value of the clutch lubrication pressure, whereas, the start clutch control valve pressure 2 decreases to 0 bar according as the flow path for clutch lubrication pressure control is closed and the discharge port is opened over the fixed value.

In addition, the start clutch control valve includes a valve housing, in which a flow path supplying the pressure of the start clutch control valve to the limp home valve and a flow path receiving the pressure of the limp home valve are established in turn at the top thereof, and flow paths receiving the start clutch control pressure 1 and the start clutch control pressure 2 that receive the pressure from the lubrication control valve are arranged at the bottom thereof, and the start clutch control valve pressure 1 supplied to the limp home valve is increased slowly until the flow path for clutch lubrication pressure control is closed, thus executing the clutch slip control and, the start clutch control valve pressure 1 is increased rapidly after the flow path for clutch lubrication pressure control is closed to generate a pilot pressure for clutch control.

DETAILED DESCRIPTION OF THE INVENTION

Hereinafter, preferred embodiments of the present invention will now be described in detail with reference to the attached drawings.

In general, it is necessary to control the start clutch in order to secure a minimum operability when the transmission control unit fails completely. FIGS. 1 to 4 depict a hydraulic circuit diagram showing a hydraulic control system applied to a continuously variable transmission (CVT) in accordance with an embodiment of the present invention and schematic diagrams illustrating the hydraulic conditions when a transmission control unit (TCU) operates normally. The TCU generally will include a processor, memory and associated hardware and software as may be selected by a person of ordinary skill in the art based on teachings of the present invention for hydraulic circuit control. The functions of line regulator valve (LRV) 10 and secondary valve 11 are individually, generally the same as in a conventional CVT for a hybrid electric vehicle and therefore their use in embodiments of the present invention will be understood by persons of ordinary skill in the art based on the teachings herein provided.

Figure 1:
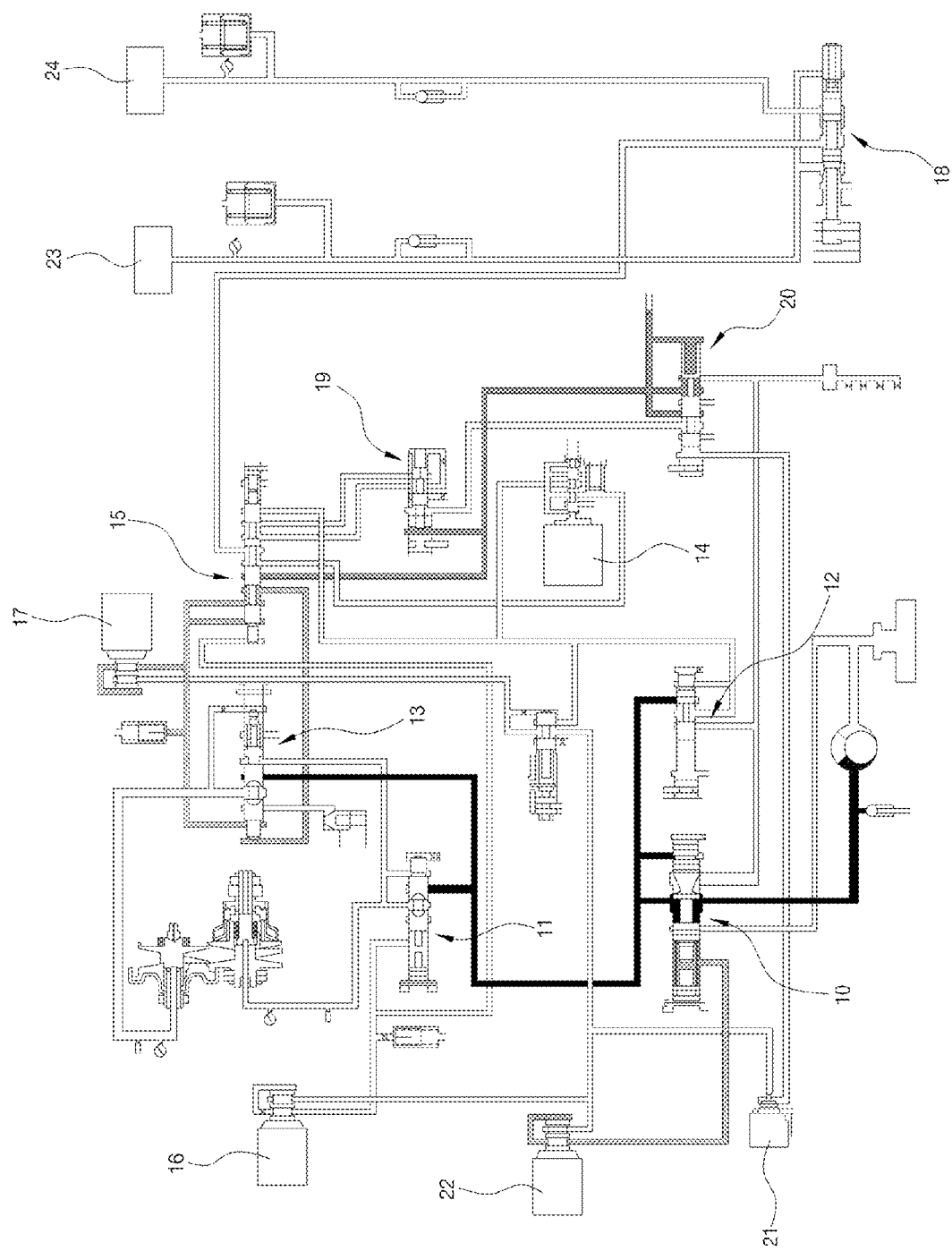
FIG. 1 is a hydraulic circuit diagram depicting a hydraulic control system for a continuously variable transmission for a hybrid electric vehicle in accordance with the present invention in a normal operation.
Figure 2:
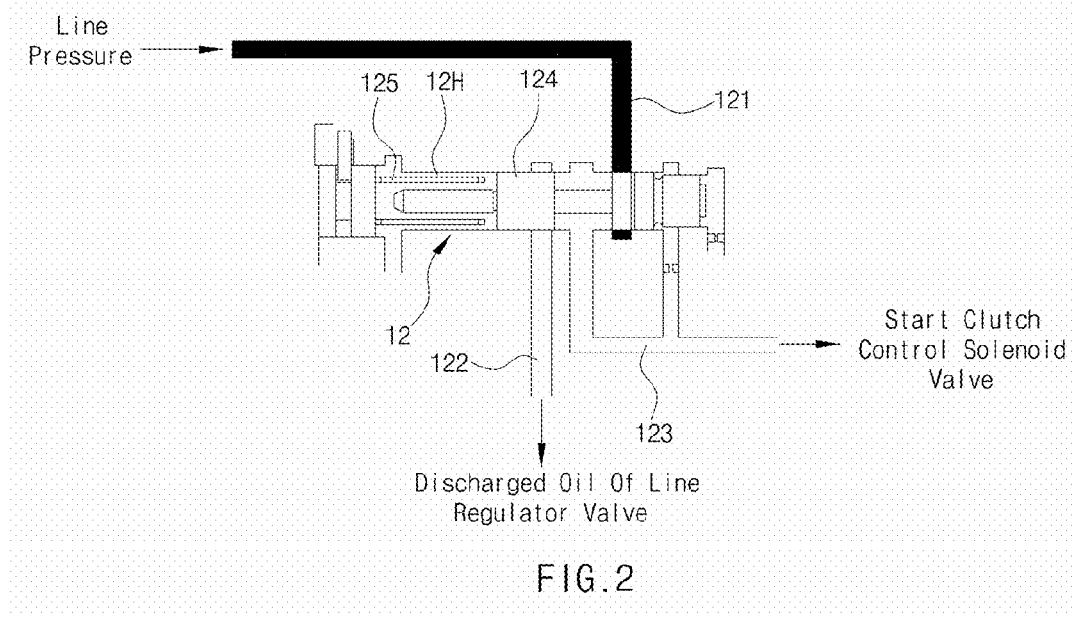
FIG. 2 is a schematic diagram illustrating a second regulator valve in accordance with an embodiment of the present invention.

As illustrated in FIG. 2, a secondary regulator valve (SRV) 12 in accordance with an embodiment of the present invention includes a valve housing 12H, defining input and output parts for flow paths 121, 122 and 123. Flow path 121 couples the secondary valve 11 and ratio control valve 13 with SRV 12. Flow path 122 communicates with the discharged oil of the line regulator valve 10. Flow path 123 supplies flux to a start clutch control solenoid valve 14.

Inside the valve housing 12H, an operation plunger 124 receives the oil pressure from the secondary valve 11 and the ratio control valve 13 to open and close flow path 122 connected with the discharged oil of the line regulator valve 10. A spring 125 supports the operation plunger 124 elastically.

Figure 3:
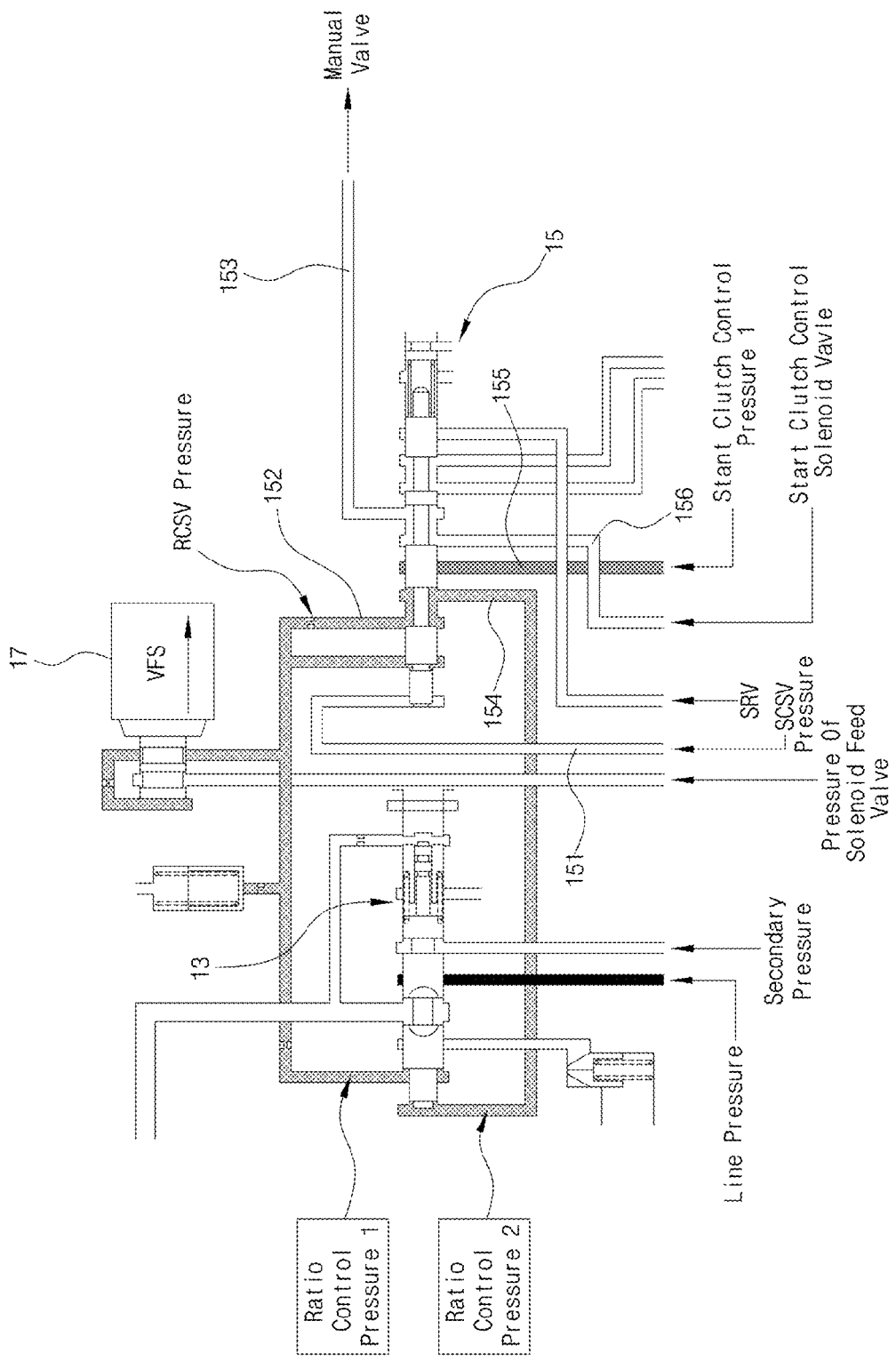
FIG. 3 is a schematic diagram illustrating a limp home valve in a normal operation in accordance with an embodiment of the present invention.

The secondary regulator valve 12 receives the line pressure to reduce the pressure and supplies the reduced pressure to the start clutch control solenoid valve 14. does not transfer the discharged flux but connects the flux with the discharged oil of the line regulator valve 10, thus reusing the flux. The individual function of a solenoid feed valve is the same as that of a conventional hybrid electric vehicle and will be understood by persons of ordinary skill in the art As illustrated in FIG. 3, a limp home valve 15 in accordance with an embodiment of the present invention includes a valve housing 15H, defining ports for flow paths including: a flow path 151 receiving pressure of a secondary control solenoid valve (SCSV) 16 at an end, a flow path 152 supplying pressure from ratio control solenoid valve (RCSV) 17 (ratio control pressure 1), and a flow path 153 supplying pressure to a manual valve 18, a flow path 154 supplying a pressure from ratio control solenoid valve 17 (ratio control pressure 2), a flow path 155 receiving start clutch control pressure 1, a flow path 156 receiving pressure from start clutch control solenoid valve 14, a flow path 157 receiving pressure from start clutch control valve 19, a flow path 158 receiving pressure from secondary regulatory valve 12 and supplying the same to the start clutch control valve 19, and a flow path 159 receiving pressure from the secondary regulator valve 12.

Inside the valve housing 15H, a plurality of operation plungers 15' are established in series and the operation plunger positioned at the most right is supported elastically by a spring 15".

In the CVT, the pressure of the secondary control solenoid valve (SCSV) 16 becomes maximum when the CVT goes into a stall mode, which requires the most clamping force on the belt. Moreover, the pressure of the ratio control solenoid valve (RCSV) 17 becomes maximum when it goes into a full overdrive mode. Accordingly, a state where the engine is in the stall mode and, at the same time, the transmission ratio is in the full overdrive mode cannot exist in a normal operation state. However, the normal high-type SCSV 16 pressure and the RCSV 17 pressure maybe at a maximum state at the same time.

A limp home valve spring 15" is provided so that the limp home valve 15 moves to the right completely when the SCSV 16 pressure and the RCSV 17 pressure becomes is at the maximum state. As such, feedback in embodiments of the present invention is provided through two pressures, i.e., the SCSV 16 pressure and the RCSV 17 pressure at the same time. Accordingly, the control pressure range of the solenoid valve used for the limp home decision is decreased. Consequently, the pressure range of the solenoid valve used in a normal operation becomes wider.

The ratio control valve 13 is similar to the conventional CVT for the hybrid electric vehicle; however, it has a difference in that the ratio control pressure 1 and the ratio control pressure 2 control the pressure of the ratio control valve 13. In normal operation, the ratio control pressure 1 and rational control pressure 2 are the same.

Figure 4:
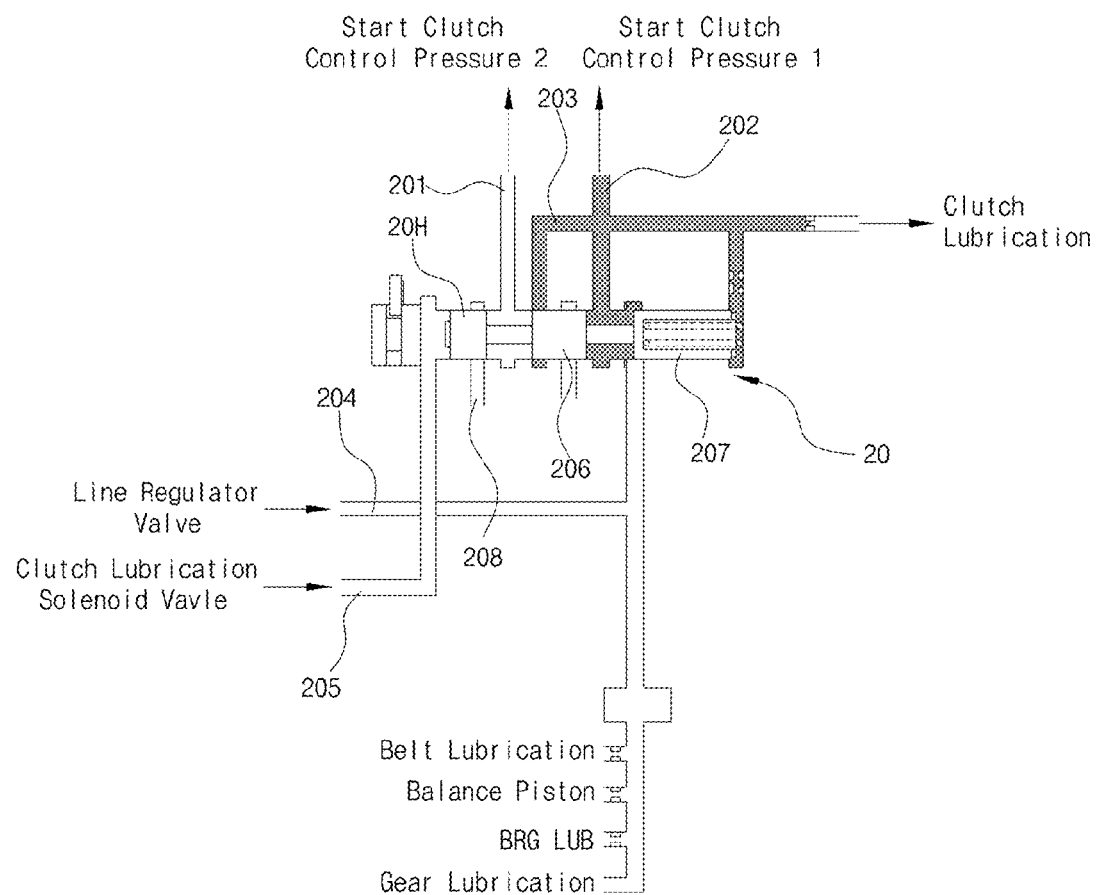
FIG. 4 is a schematic diagram illustrating a lubrication control valve in accordance with an embodiment of the present invention.
Figure 5:
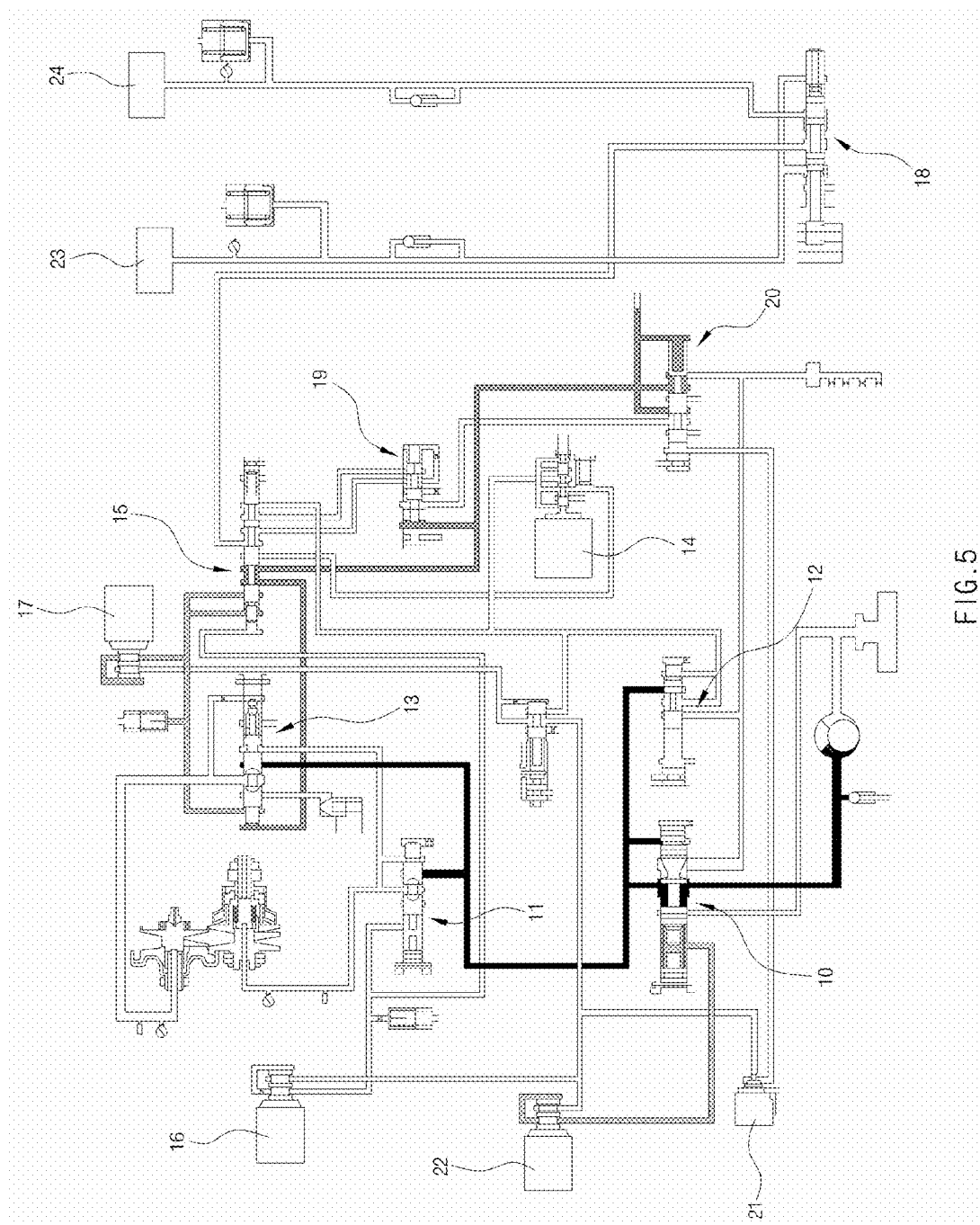
FIG. 5 is a hydraulic circuit diagram depicting a hydraulic control system for a continuously variable transmission for a hybrid electric vehicle in accordance with an embodiment of the present invention when a transmission control unit fails.
Figure 6:
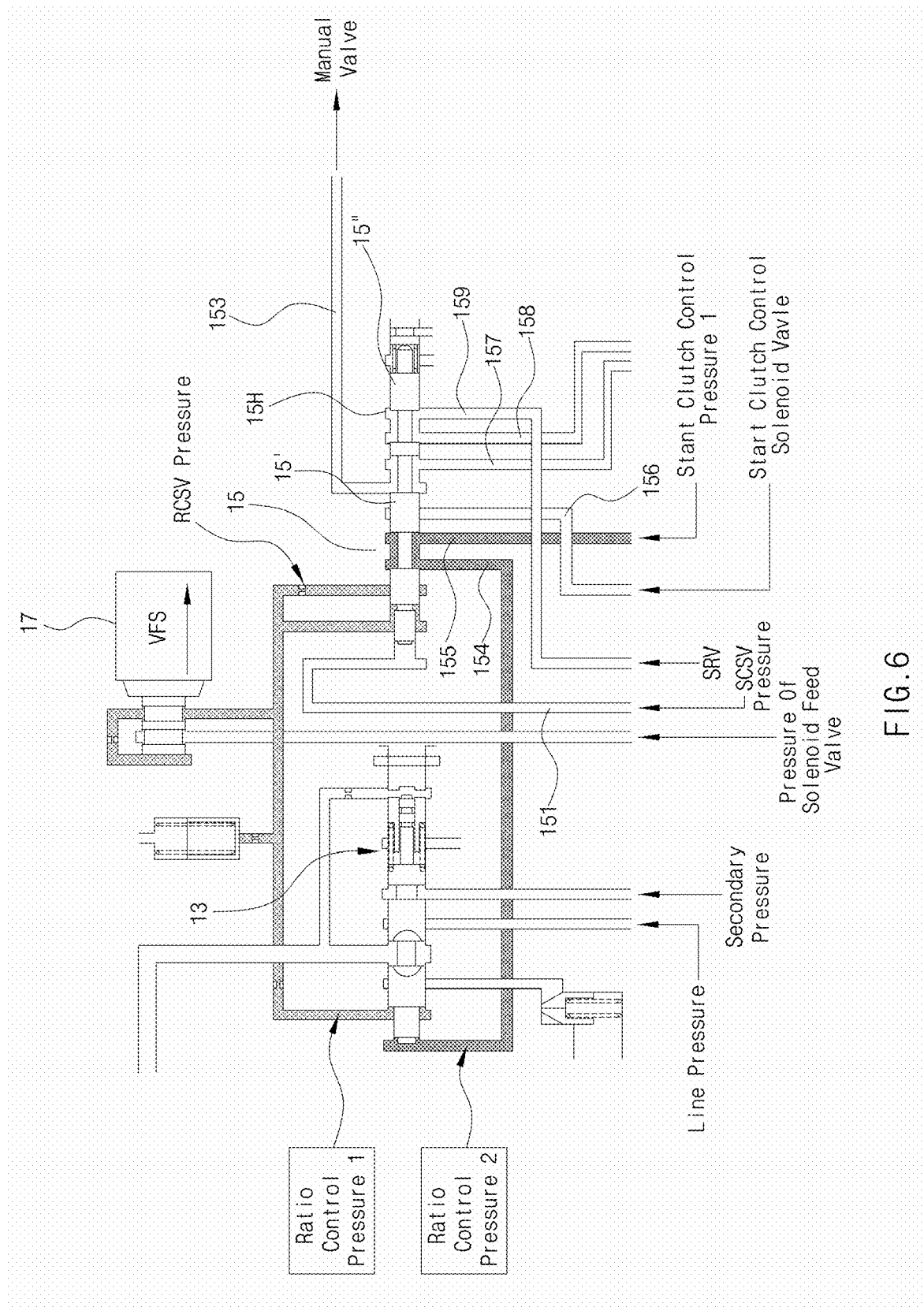
FIG. 6 is a schematic diagram illustrating a limp home valve in accordance with an embodiment of the present invention when a transmission control unit fails.

As illustrated in FIG. 4, a lubrication control valve 20 includes a valve housing 20H, defining ports communicating, with flow paths including: a start clutch control pressure 1 flow path 201 supplying pressure to the start clutch control valve 19, a flow path 203 for clutch lubrication pressure control, a start clutch control pressure 2 flow path 202, a flow path 204 receiving flux from the line regulator valve 10, and a flow path 205 receiving pressure from a clutch lubrication control solenoid valve 21. Inside the valve housing 20H, a plurality of operation plungers 206 are arranged in series and a spring 207 supporting the operation plungers 206 elastically is included.

The lubrication control valve 20 receives flux discharged from the line regulator valve 10 and controls the clutch lubrication pressure. The control pressure is controlled by the pressure of the clutch lubrication control solenoid valve 21.

In the region where the rotational speed of the oil pump (engine rotational speed) is low, flux discharged from the line regulator valve 10 is of small quantity and, accordingly, the pressure supplied from the line regulator valve 10 is lowered. If the pressure of the line regulator valve 10 is lower than the fixed value of the lubrication control valve 20, the lubrication control valve 20 moves to the right and the pressure of the line regulator valve 10 and the clutch lubrication pressure become equal to each other.

However, if flux discharged from the line regulator valve 10 is increased as the rotational speed of the oil pump is increased, the pressure of the line regulator valve 10 rises and, accordingly, the lubrication control valve 20 controls the pressure to the fixed pressure. That is, the start clutch control valve pressure 2 becomes equal to the start clutch control pressure (i.e., the clutch lubrication pressure) as the lubrication control vale 20 moves to the right below the fixed value of the clutch lubrication pressure, whereas, it decreases to 0 bar as flow path 203 for clutch lubrication pressure control is closed and discharge port 208 is opened over the fixed value of the clutch lubrication pressure. In normal operation, the start clutch control vale 19 does not operate.

Hydraulic conditions in embodiments of present invention, when the TCU fails, are described in more detail below with reference to FIGS. 5 to 9.

The pressure of the line regulator valve 10 and the secondary valve 11 is controlled to maximum pressure by a line regulator solenoid valve 22 and the secondary control solenoid valve 16. The secondary regulator valve 12 operates the same as it does in the normal operation.

In the CVT, the secondary control solenoid valve (SCSV) 16 pressure reaches a maximum state when it goes into a stall mode, which requires the most clamping force of the belt. Moreover, the ratio control solenoid valve (RCSV) 17 pressure reaches a maximum state when it goes into a full overdrive mode. Accordingly, the state where the engine is in the stall mode and, at the same time, the transmission ratio is in the full overdrive mode can not exist in a normal operation state, and a limp home valve spring 15" is provided so that the limp home valve 15 moves to the right completely. As aforementioned, embodiments of the present invention receives feedback pressure in the form of two pressures, i.e., the SCSV 16 pressure and the RCSV 17 pressure. Accordingly, the control pressure range of the solenoid valve used for the limp home decision is decreased. Consequently, the pressure range of the solenoid valve used in a normal operation becomes wider.

As described above, when the transmission control unit (TCU) fails, the limp home valve 15 moves to the right and, accordingly, the start clutch control pressure 1 is supplied to the flow path of the ratio control pressure 2. Consequently, the ratio control valve 13 is controlled by being connected with the start clutch control valve pressure 1. That is, if the engine rotational speed is increased, the start clutch control pressure 1 is increased. Accordingly, if the engine rotational speed is increased, the ratio control pressure rises and the CVT moves upward, whereas, if the engine rotational speed is decreased, the ratio control pressure falls and the CVT moves downward.

Typically a conventional pulley control valve B is fixed to a pressure, however, according to embodiments of the present invention, speed changes are made as the ratio control valve 13 is controlled based on the engine rotational speed. Accordingly, it is possible to start at the underdrive and maintain the overdrive during the operation at high speed. Moreover, the pressure of the start clutch control valve 19 is supplied to the manual valve 18 to control a forward clutch 23 or a reverse brake 24.

The ratio control valve 13 in accordance with embodiments of the present invention is somewhat similar to a conventional CVT; however, it has a difference in that the ratio control pressure 1 and the ratio control pressure 2 (i.e., the start clutch control pressure 1) control the pressure of the ratio control valve 13.

As illustrated in FIG. 4, the operation state of the lubrication control valve 20 is the same as that in the normal operation. However, the clutch lubrication control solenoid valve 21 is of a normal high type and the lubrication control valve 20 is controlled at the maximum pressure.

Figure 7:
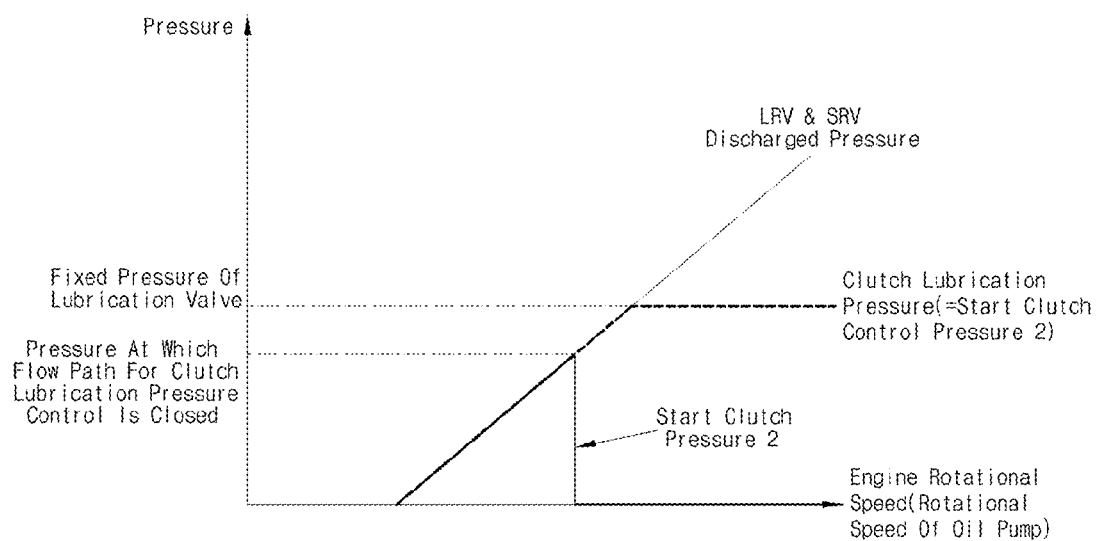
FIG. 7 is a graph depicting pressures based on engine rotational speeds in a lubrication control valve.

FIG. 7 is a graph depicting pressures based on engine rotational speeds in the lubrication control valve, in which the start clutch control valve pressure 2 becomes equal to the start clutch control pressure 1 (i.e., the clutch lubrication pressure) below the fixed value of the clutch lubrication pressure, whereas, it decreases to 0 bar as the flow path 203 for clutch lubrication pressure control is closed and the discharge port 208 is opened over the fixed value of the clutch lubrication pressure.

Figure 8:
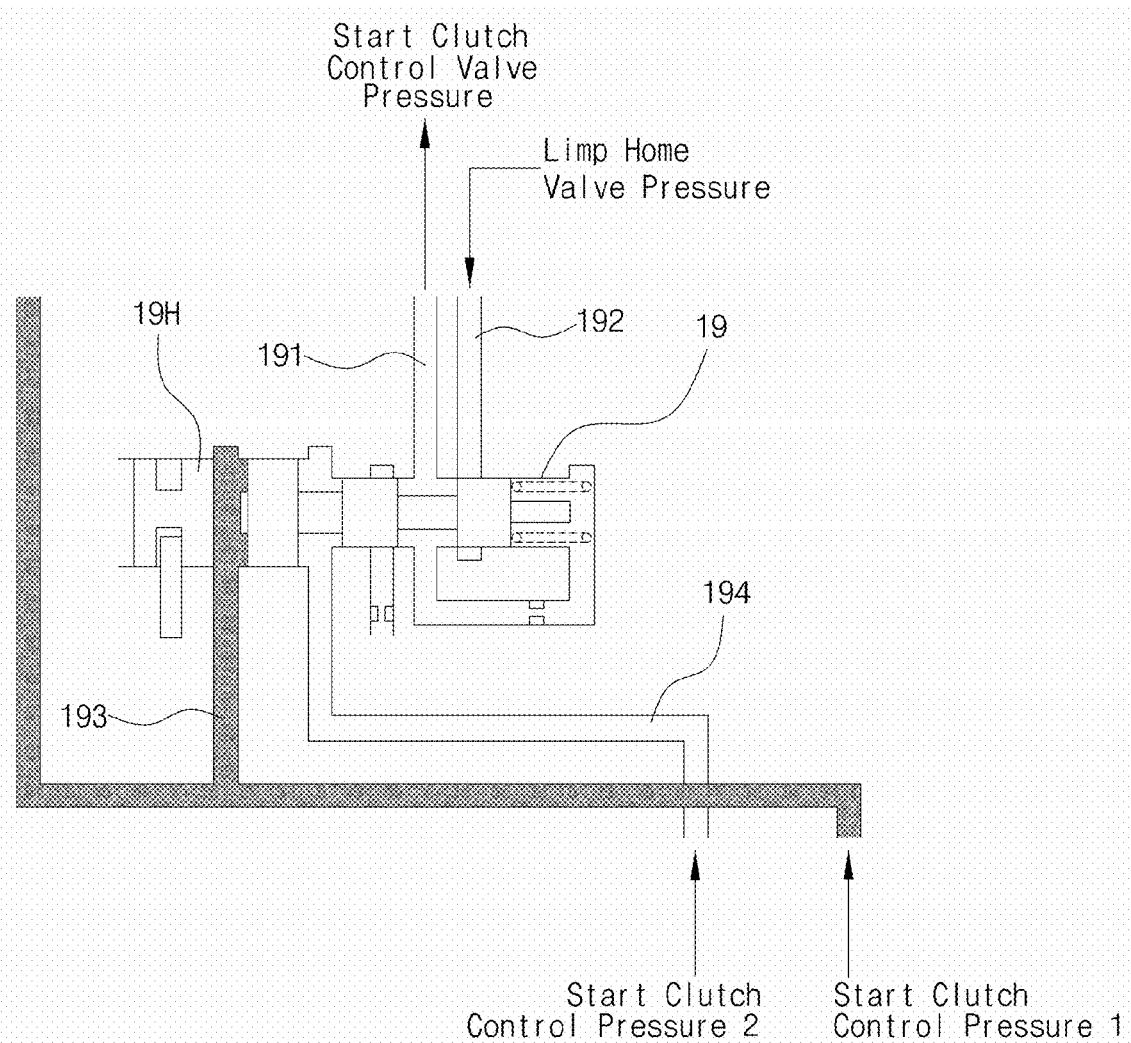
FIG. 8 is a schematic diagram illustrating a start clutch control valve in accordance with an embodiment of the present invention when a transmission control unit fails.

As depicted in FIG. 8, the start clutch control valve 19 includes a valve housing 19H defining ports communicating with flow paths including: a flow path 191 supplying pressure of the start clutch control valve 19 to the limp home valve 15, a flow path 192 receiving the pressure of the limp home valve 15, and flow paths 193 and 194 receiving the start clutch control pressure 1 and the start clutch control pressure 2 that receive the pressure from the lubrication control valve 20.

Figure 9:
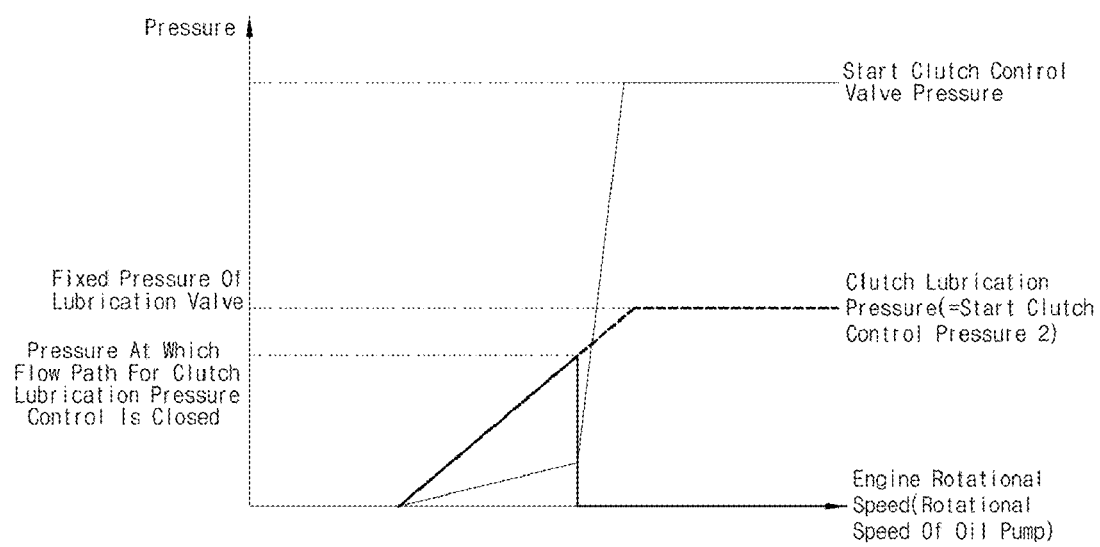
FIG. 9 is a graph depicting pressures based on engine rotational speeds in a start clutch control valve.

FIG. 9 is a graph depicting pressures based on engine rotational speeds in the start clutch control valve, in which the start clutch control pressure 1 is increased in proportion to the engine rotational speed and the start clutch control pressure 2 is increased the same as the start clutch control pressure 1 up to a specific pressure and decreased to 0 bar. Accordingly, the start clutch control pressure 2 is increased with a gradient lower than that of the start clutch control pressure 1 up to the engine rotational speed where the flow path 203 for clutch lubrication pressure control is closed, thus executing the clutch slip control and, then, the clutch control pressure is increased rapidly to start the clutch completely. To this end, it is possible to protect and control the clutch by executing the slip control even in the limp home mode.

As above, preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

As described in detail above, a hydraulic control system for the continuously variable transmission for the hybrid electric vehicle in accordance with embodiments of the present invention has at least the following advantageous effects:

(1) Control of the Primary Pulley

In the past, the pressure of the drive pulley is regular and the ratio change is made based on only the input torque, however, in the present invention, the speed changes are made based on the input torque and the engine rotational speed as the pressure of the primary pulley is controlled by the engine rotational speed, thus enhancing the operability.

(2) Decision of the Limp Home Mode

In the conventional CVT, the limp home mode is decided when the drive pulley control valve is being under the maximum pressure, however, in the present invention, the limp home mode is decided only when the secondary control solenoid valve and the ratio control solenoid valve are being under the maximum pressure at the same time. Accordingly, the range available in controlling the pressure in a normal operation is more excellent than the conventional art.

(3) Control of the Clutch Supplying Pressure

In the past, the flux discharged under reduced pressure from the clutch pressure reducing valve is transferred to the tank, however, the present invention reuses flux discharged under reduced pressure from the secondary regulator valve in the lubrication control valve, thus reusing the flux effectively.

(4) Lubrication and Clutch Control Pressure

In the past, the lubrication pressure is controlled by a fixed pressure, the pilot pressure for the clutch control uses two valves when the transmission control unit fails and the flux discharged from the PH regulator valve is used directly as the pilot pressure, however, the present invention can control the lubrication pressure actively using PWM and generate the pilot pressure for the clutch control using a single valve when the transmission control unit fails.

Moreover, the present invention receives the flux discharged from the line regulator valve to generate the pilot pressure through the lubrication control valve.

What is claimed is:

1. A hydraulic control system for a continuously variable transmission for a hybrid electric vehicle, in which speed changes are made based on input torques and engine rotational speeds, wherein:

pressure of a primary pulley is controlled by a ratio control valve based on engine rotational speeds when a transmission control unit fails;

the ratio control valve is controlled by a first ratio control pressure 1 and a second ratio control pressure 2;

the ratio control valve is controlled by being connected with a first start clutch control pressure 1 as the first start clutch control pressure 1 is supplied to a flow path of the second ratio control pressure 2 through a limp home valve when the transmission control unit fails;

if the engine rotational speed is increased, the pressure of the ratio control valve rises and the continuously variable transmission moves upward, whereas, if the engine rotational speed is decreased, the pressure of the ratio control valve falls and the continuously variable transmission moves downward; and wherein the limp home valve comprises:

a valve housing defining parts communicating with plural flow paths comprising a flow path receiving pressure of a secondary control solenoid valve from an end, a flow path supplying the ratio control pressure 1, a flow path supplying a pressure to a manual valve, a flow path supplying the ratio control pressure 2, a flow path receiving the start clutch control pressure 1, a flow path receiving the pressure of a start clutch control solenoid valve, a flow path receiving a pressure of a start clutch control valve, a flow path receiving a pressure of a secondary regulatory valve and supplying the same to the start clutch control valve, and a flow path receiving the pressure from a secondary regulator; and a plurality of operation plungers established in series inside the valve housing controlling communication between said flow paths and a spring supporting the operation plunger positioned an end of said housing.

2. A hydraulic control system for a continuously variable transmission for a hybrid electric vehicle, in which speed changes are made based on input torques and engine rotational speeds, wherein:

pressure of a primary pulley is controlled by a ratio control valve based on engine rotational speeds when a transmission control unit fails;

the ratio control valve is controlled by a first ratio control pressure 1 and a second ratio control pressure 2;

the ratio control valve is controlled by being connected with a first start clutch control pressure 1 as the first start clutch control pressure 1 is supplied to a flow path of the second ratio control pressure 2 through a limp home valve when the transmission control unit fails;

if the engine rotational speed is increased, the pressure of the ratio control valve rises and the continuously variable transmission moves upward, whereas, if the engine rotational speed is decreased, the pressure of the ratio control valve falls and the continuously variable transmission moves downward;

wherein a lubrication control valve is a source of pilot pressure during a limp-home condition; and further comprising a secondary regulator valve receiving a line pressure to reduce the pressure and supplying the reduced pressure to the lubrication control valve.

3. The hydraulic control system for a continuously variable transmission for a hybrid electric vehicle as recited in claim 2, wherein the lubrication control valve controls the lubrication pressure actively using PWM and generates a pilot pressure for clutch control using a single valve when the transmission control unit fails.

4. The hydraulic control system for a continuously variable transmission for a hybrid electric vehicle as recited in claim 3, wherein:

the lubrication control valve receives flux discharged from a line regulator valve and controls the lubrication pressure by a clutch lubrication control solenoid valve; and if the pressure of the line regulator valve is lower than a fixed pressure of the lubrication control valve as flux discharged from the line regulator valve is decreased in a region where the engine rotational speed is lowered, the lubrication control valve moves in a direction making the pressure of the line regulator valve and the lubrication pressure equal to each other, whereas, if the pressure of the line regulator valve is higher than the fixed pressure of the lubrication control valve according as the flux discharged from the line regulator valve is increased in the region where the engine rotational speed is increased, the lubrication control valve moves in an opposite direction making the fixed pressure of the lubrication control valve become the lubrication pressure.

5. The hydraulic control system for a continuously variable transmission for a hybrid electric vehicle as recited in claim 4, wherein the lubrication control valve comprises:

a valve housing defining ports communicating with plural flow paths comprising a first start clutch control pressure 1 flow path supplying a pressure to a start clutch control valve, a second start clutch control pressure 2 flow path, a flow path for clutch lubrication pressure control, a flow path receiving flux from the line regulator valve, a discharge port and a flow path receiving a pressure from a clutch lubrication control solenoid valve; and a plurality of operation plungers arranged in series inside the valve housing to control communication between said flow paths and a spring supporting the operation plungers elastically.

6. The hydraulic control system for a continuously variable transmission for a hybrid electric vehicle as recited in claim 5, wherein the second start clutch control valve pressure 2 formed through the second start clutch control pressure 2 flow path becomes equal to the first start clutch control pressure 1 below a fixed value of the clutch lubrication pressure, whereas, the second start clutch control valve pressure 2 decreases to 0 bar as the flow path for clutch lubrication pressure control is closed and the discharge port is opened over the fixed value.

7. A hydraulic control system for a continuously variable transmission for a hybrid electric vehicle in which speed changes are made based on input torques and engine rotational speeds, wherein:

pressure of a primary pulley is controlled by a ratio control valve based on engine rotational speeds when a transmission control unit fails;

the ratio control valve is controlled by a first ratio control pressure 1 and a second ratio control pressure 2;

wherein a lubrication control valve controls the lubrication pressure actively using PWM and generates a pilot pressure for clutch control using a single valve when the transmission control unit fails;

wherein the lubrication control valve receives flux discharged from a line regulator valve and controls the lubrication pressure by a clutch lubrication control solenoid valve; and if the pressure of the line regulator valve is lower than a fixed pressure of the lubrication control valve as flux discharged from the line regulator valve is decreased in a region where the engine rotational speed is lowered, the lubrication control valve moves in a direction making the pressure of the line regulator valve and the lubrication pressure equal to each other, whereas, if the pressure of the line regulator valve is higher than the fixed pressure of the lubrication control valve according as the flux discharged from the line regulator valve is increased in the region where the engine rotational speed is increased, the lubrication control valve moves in an opposite direction making the fixed pressure of the lubrication control valve become the lubrication pressure;

wherein the lubrication control valve comprises:

a valve housing defining ports communicating with plural flow paths comprising a first start clutch control pressure 1 flow path supplying a pressure to a start clutch control valve, a second start clutch control pressure 2 flow path, a flow path for clutch lubrication pressure control, a flow path receiving flux from the line regulator valve, a discharge port and a flow path receiving a pressure from a clutch lubrication control solenoid valve; and a plurality of operation plungers arranged in series inside the valve housing to control communication between said flow paths and a spring supporting the operation plungers elastically;

wherein the second start clutch control valve pressure 2 formed through the second start clutch control pressure 2 flow path becomes equal to the first start clutch control pressure 1 below a fixed value of the clutch lubrication pressure, whereas, the second start clutch control valve pressure 2 decreases to 0 bar as the flow path for clutch lubrication pressure control is closed and the discharge port is opened over the fixed value; and wherein the start clutch control valve includes a valve housing defining ports communicating with plural flow paths comprising a flow path supplying the pressure of the start clutch control valve to a limp home valve, a flow path receiving the pressure of the limp home valve, and flow paths receiving the first start clutch control pressure 1 and the second start clutch control pressure 2 that receive the pressure from the lubrication control valve, are wherein the first start clutch control valve pressure 1 supplied to the limp home valve is increased slowly until the flow path for clutch lubrication pressure control is closed, thus executing the clutch slip control and, the start clutch control valve pressure 1 is increased rapidly after the flow path for clutch lubrication pressure control is closed to generate a pilot pressure for clutch control.

* * * * *